US 7,659,692 B2
Feb. 9, 2010

(12) United States Patent
Sainomoto et al.

(10) Patent No.: US 7,659,692 B2
(45) Date of Patent: *Feb. 9, 2010

(54) RECHARGEABLE BATTERY PACK FOR A POWER TOOL HAVING AN INTERRUPTOR FOR PREVENTION OF OVERCHARGING

(75) Inventors: Yoshinori Sainomoto, Sanda (JP); Toshiharu Ohashi, Maibara (JP); Hiroshi Miyazaki, Hikone (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 249 days.

This patent is subject to a terminal disclaimer.

(21) Appl. No.: 11/599,415

(22) Filed: Nov. 15, 2006

(65) Prior Publication Data

US 2007/0108940 A1 May 17, 2007

(30) Foreign Application Priority Data

Nov. 17, 2005 (JP) ............................. 2005-333282

(51) Int. Cl.
*H02J 7/00* (2006.01)
(52) U.S. Cl. ................. 320/112; 320/116; 320/119; 320/124; 320/134; 320/136; 324/433
(58) Field of Classification Search ................. 320/106, 320/112, 114, 116, 119, 124, 133–135; 324/427, 324/433, 434
See application file for complete search history.

(56) References Cited

U.S. PATENT DOCUMENTS

| 5,304,915 | A | | 4/1994 | Sanpei et al. |
| 5,493,197 | A | | 2/1996 | Eguchi et al. |
| 5,617,010 | A | | 4/1997 | Higashijima et al. |
| 5,903,131 | A | * | 5/1999 | Sekine et al. ............... 320/106 |
| 6,091,225 | A | * | 7/2000 | Kim et al. ................... 320/114 |
| 6,215,274 | B1 | * | 4/2001 | Dotzler ....................... 320/106 |

(Continued)

FOREIGN PATENT DOCUMENTS

EP 0 512 340 A1 11/1992

(Continued)

OTHER PUBLICATIONS

Search Report, EP 06 02 3688, Jun. 7, 2007.

(Continued)

*Primary Examiner*—Edward Tso
*Assistant Examiner*—Arun Williams
(74) *Attorney, Agent, or Firm*—Edwards Angell Palmer & Dodge LLP

(57) ABSTRACT

A battery pack for a power tool of self-contained over-charge protection is proposed. The battery pack includes a battery stack composed of a plurality of series connected secondary cells, and a charge terminal connected through a charge current path to the battery stack for flowing a charge current from a charger. The battery pack includes an interrupter inserted in the charge current path, and an over-charge detector which detects a cell voltage across each of the secondary cells and actuates the interrupter to open the charge current path when any one of the cell voltages becomes higher than a predetermined threshold ($V_{TH3}$). Thus, even if the charger fails to limit the charge current, the battery pack can itself protect the secondary cells from being over-charged.

5 Claims, 4 Drawing Sheets

U.S. PATENT DOCUMENTS

| | | | |
|---|---|---|---|
| 6,268,710 B1 * | 7/2001 | Koga | 320/116 |
| 6,329,795 B1 | 12/2001 | Nakashimo | |
| 6,329,796 B1 | 12/2001 | Popescu | |
| 6,998,818 B2 * | 2/2006 | Xiong et al. | 320/134 |
| 7,408,325 B2 * | 8/2008 | Yamamoto et al. | 320/133 |
| 2001/0017534 A1 | 8/2001 | Haraguchi et al. | |
| 2003/0062872 A1 | 4/2003 | Brotto | |
| 2003/0137279 A1 | 7/2003 | Baur et al. | |
| 2004/0263119 A1 | 12/2004 | Meyer et al. | |
| 2005/0077878 A1 | 4/2005 | Carrier et al. | |
| 2005/0280393 A1 * | 12/2005 | Feldmann | 320/114 |
| 2006/0043929 A1 * | 3/2006 | Koyanagi et al. | 320/114 |
| 2006/0087286 A1 * | 4/2006 | Phillips et al. | 320/114 |
| 2006/0255769 A1 * | 11/2006 | Liu et al. | 320/134 |

FOREIGN PATENT DOCUMENTS

| | | |
|---|---|---|
| EP | 0 588 613 A2 | 3/1994 |
| EP | 0 721 247 A2 | 7/1996 |
| EP | 1 594 209 A1 | 11/2005 |
| JP | 08-023639 | 1/1996 |
| JP | 08-083627 | 3/1996 |
| JP | 10-056742 | 2/1998 |
| JP | 2000-032674 | 1/2000 |
| JP | 2002-186187 | 6/2002 |
| JP | 2003-264008 | 9/2003 |
| JP | 2005-131770 | 5/2005 |
| JP | 2005-168215 | 6/2005 |
| JP | 2005-218174 | 8/2005 |

OTHER PUBLICATIONS

Japanese Office Action dated Jun. 3, 2008 issued in JP2005-333282.

* cited by examiner

RECHARGEABLE BATTERY PACK FOR A POWER TOOL HAVING AN INTERRUPTOR FOR PREVENTION OF OVERCHARGING

BACKGROUND OF THE INVENTION

1. Field of the Invention

The present invention is directed to a rechargeable battery pack for a power tool, and is more particularly to a battery pack with a self-contained over-charge protection.

2. Description of the Related Art

A rechargeable battery pack has been widely utilized for a power tool. Recently, lithium-ion batteries are becoming prevalent over conventional nickel-cadmium and nickel-hydrogen batteries because of their high power generating capability and also their light weight structure. In order to safely utilize a lithium-ion battery for the power tool, it is required to make a protection against over-charging of the battery, because the lithium-ion battery is especially susceptible to an over-charging and may rapidly deteriorate by the over-charging.

In order to avoid the over-charging, Japanese Patent Publication JP 2005-218174 A and JP2005-131770 A propose a combination of a battery pack and a charger. The battery pack has a battery stack composed of a series connected secondary cells, and incorporates a voltage monitor which is configured to detect a cell voltage across each one of the secondary cells so as to provide a detection signal indicative of the cell voltage to the charger and the power tool. The charger includes a charging circuit supplying a charge current to the battery stack based upon the detection signal so as to limit the charge current when the detection signal indicates that any one of the cells is over-charged. However, because the over-charging protection relies upon a current controller provided on the side of the charger, the protection cannot work if the charger becomes out of order. Thus, the battery may be accidentally over-charged as a consequence of the failure of the charger.

SUMMARY OF THE INVENTION

In view of the above problem, the present invention has been accomplished to provide a rechargeable battery pack for a power tool which has a self-contained over-charge protection capable of protecting the battery from being over-charged even if an associated charger fails to limit a charge current. The battery pack in accordance with the present invention includes a battery stack composed of a plurality of series connected secondary cells, a pair of power output terminals connected across the battery stack to supply a voltage of the battery stack for operating the power tool, and a signal connector configured to include a charge control terminal, a discharge control terminal, and a signal ground terminal connected to a circuit ground. The battery pack includes a charge detector which is configured to monitor a cell voltage across each one of the secondary cells and to provide a high charge-control signal when all of the cell voltages are lower than a first threshold ($V_{TH1}$) and a low charge-control signal when any one of the cell voltage becomes higher than the first threshold ($V_{TH1}$). The high charge-control signal and the low charge-control signal are fed through the charge control terminal to a charger for regulating a charge current of charging the secondary cells. The battery pack also includes a discharge detector which is configured to monitor the cell voltage across each of the secondary cells and to provide a discharge stop signal when any one of the cell voltages becomes lower than a second threshold ($V_{TH2}$) which is lower than the first threshold ($V_{TH1}$). The discharge stop signal is fed through the discharge control terminal to the power tool for deenergizing the power tool. The battery pack is also provided with a charge terminal which is separated from one of the power output terminals and is connected to the battery stack for flowing the charge current from the charger to the secondary cells not through the one of the power output terminals. An interrupter is inserted in a charge current path between the charge terminal and the battery stack. The present invention is characterized by an over-charge detector which is included in the battery pack to monitor the cell voltage across each of the secondary cells and to actuate the interrupter to open the charge current path when any one of the cell voltages becomes higher than a third threshold ($V_{TH3}$) which is higher than the first threshold ($V_{TH1}$). Thus, even if the charger fails to limit the charge current, the battery pack can itself protect the secondary cells from being over-charged.

Preferably, the interrupter is a non-resettable element such as a fusing resistor which can be only replaced by a new one once upon the over-charge protection works.

The discharge detector is preferred to include a voltage monitor and a power controller. The voltage monitor comprises a plurality of comparators and a plurality of constant voltage elements each providing a constant voltage that defines the second threshold ($V_{TH2}$). Each of the comparators is configured to compare each of the monitored cell voltages with the second threshold to give a comparison result such that the discharge detector provides the discharge stop signal to the discharge control terminal based upon the comparison results. The power controller is configured to connect the battery stack to the voltage monitor when the battery pack is connected to the power tool. Thus, the voltage monitor is made active in response to the battery pack being connected to the power tool, and can be therefore free from consuming a current from the battery stack in the absence of the power tool, i.e., the discharge current being supplied to the power tool. With this result, the battery pack can minimize power consumption within the discharge detector when the battery pack is being disconnected from the power tool. The power controller is configured to have a plurality of different current supply paths which supply a current from a common potential of the battery stack respectively to different potentials of the battery stack through each one of the constant voltage sources. Each of the current supply paths includes a switch which is configured to close only in response to a detection signal issued when the battery pack is connected to the power tool. Accordingly, no leak current flows across each of the secondary cells while the battery pack is left disconnected from the power tool, whereby it is possible to keep the voltage monitor disconnected entirely from the battery stack, assuring to consume no substantial power of the battery pack when the battery pack is left disconnected from the power tool.

Preferably, the discharge detector includes a delay circuit which delays the discharge stop signal by a predetermined time from the detection that anyone of the cell voltages becomes lower than the second threshold. With the provision of the delay circuit, it is possible to exclude a noise which would otherwise cause an erroneous control.

The power output terminals are composed of a positive output terminal and a ground terminal which is preferably isolated electrically from the circuit ground such that the charge current or discharge current can be well prevented from flowing even if the electrical connection between the battery pack and the charger or the power tool should fail.

The battery pack of the present invention may further include a temperature sensing element and an ID resistor having a resistance indicative of a kind of the battery stack. The temperature sensing element is connected across a temperature output terminal of the signal connector and the signal ground terminal to provide a temperature signal indicative of a temperature of the battery stack to the temperature output terminal. The ID resistor is connected across an ID output terminal of the signal connector and the signal ground terminal to provide the resistance to the ID output terminal. With the inclusion of these elements, it is possible to give an optimum control of charging the battery stack on the side of the charger and of operating the power tool in well consideration of the temperature and the kind of the battery stack.

DETAILED DESCRIPTION OF AN EXEMPLARY EMBODIMENT

Figure 1:
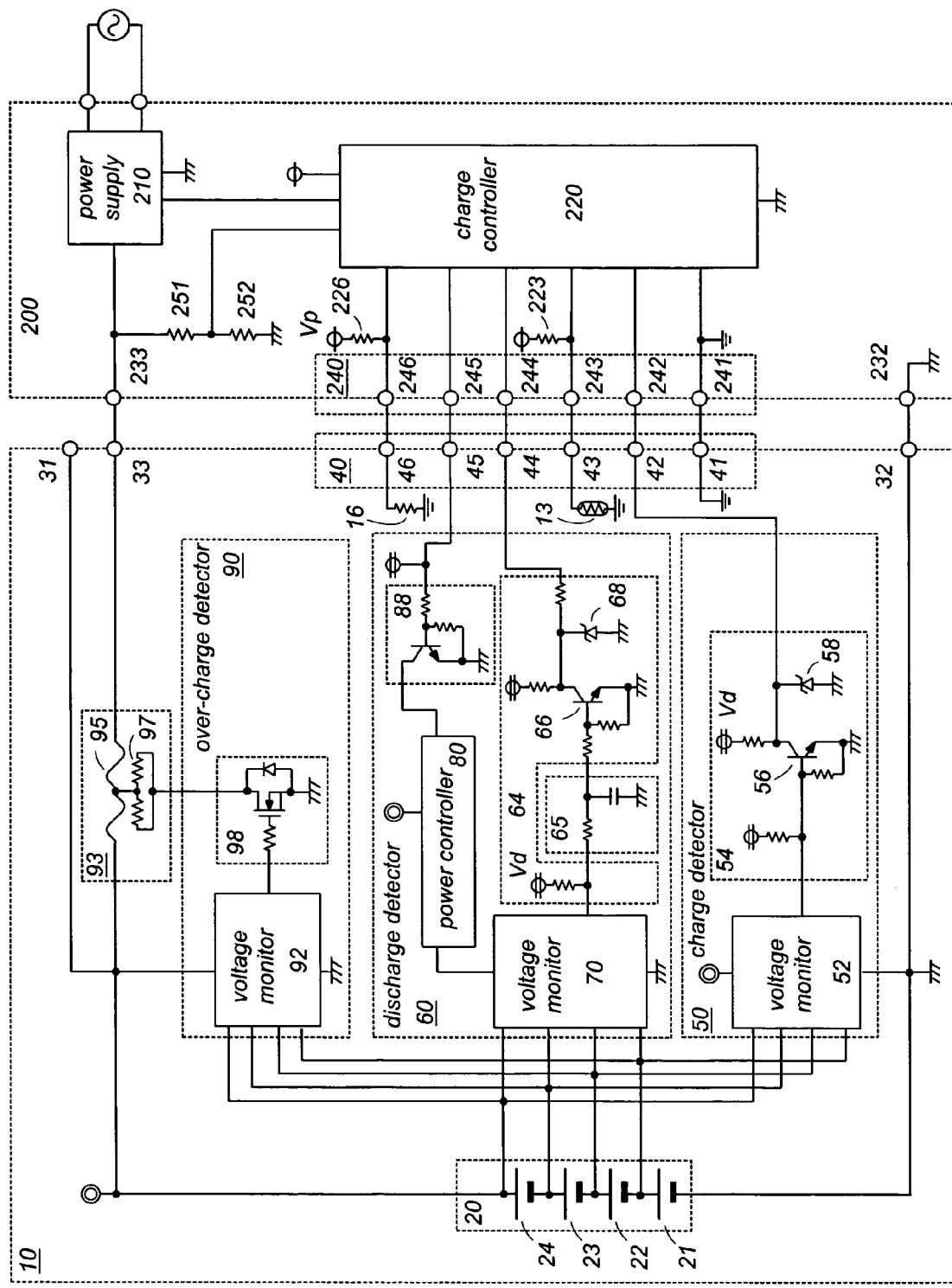
FIG. 1 is a circuit diagram of a battery pack for a power tool in accordance with an exemplary embodiment of the present invention shown as being connected an associated charger.
Figure 2:
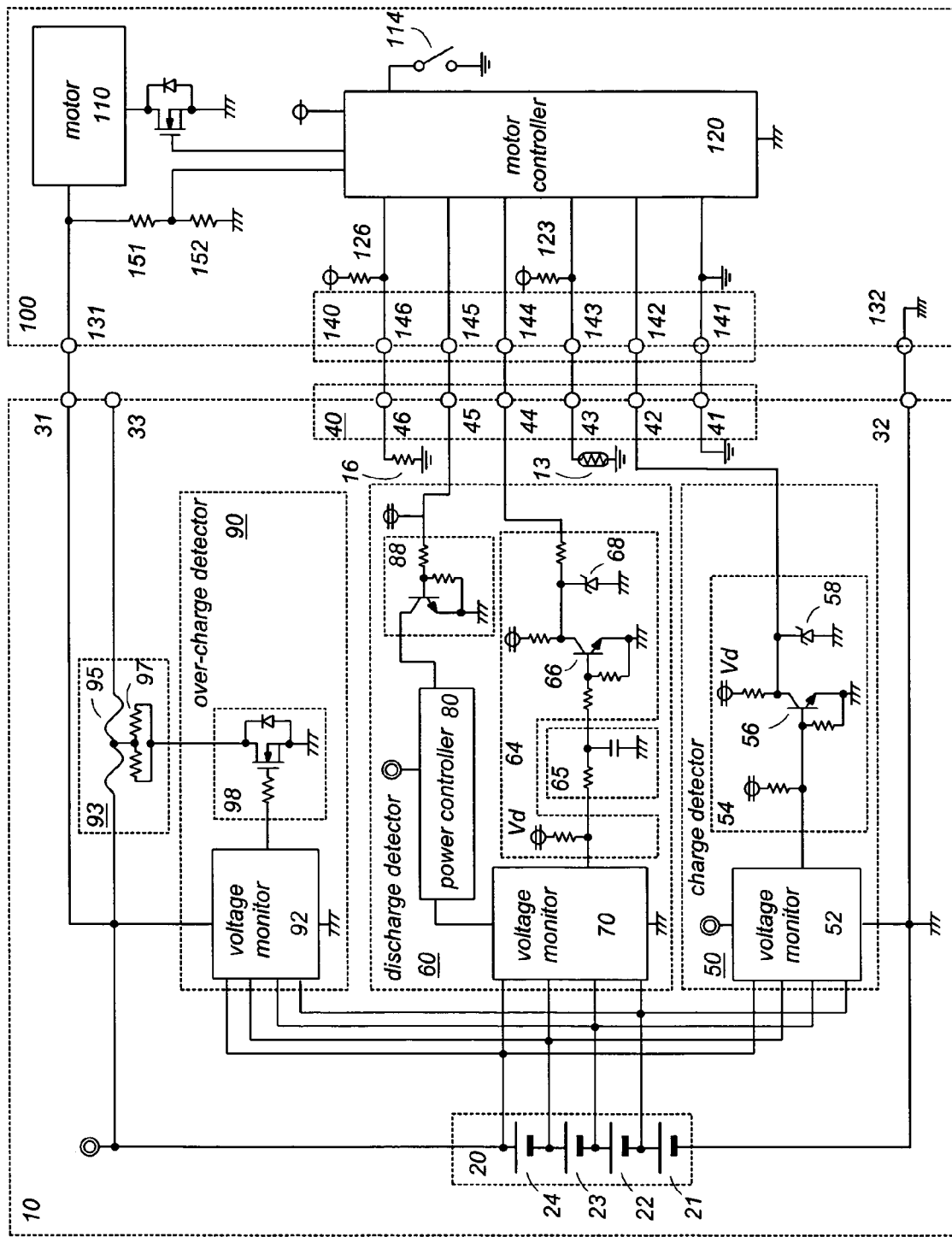
FIG. 2 is a circuit diagram of the battery pack shown as being connected to the power tool.

Referring now to FIGS. 1 and 2, there is shown a battery pack for a power tool in accordance with an exemplary embodiment of the present invention. The battery pack 10 has a casing which is detachable to the power tool 100 and to a charger 200. The casing accommodates therein a battery stack 20 composed of a plurality of series-connected lithium-ion secondary cells 21 to 24, and carries a pair of power terminals 31 and 32, a charge terminal 33, and a signal connector 40 for connection with the power tool 100 and the charger 200. The power terminals are composed of a positive output terminal 31 and a ground terminal 32 which are connected across the battery stack 20 to supply a discharge current to the power tool 100, while the charge terminal 33 and the ground terminal 32 are connected across the battery stack 20 to receive a charge current from the charger 200. The charge terminal 33 is separated from the positive output terminal 31 so that the battery stack 20 receives the charge current not through the positive output terminal 31.

The battery pack 10 includes a charge detector 50, a discharge detector 60, and an over-charge detector 90 which are configured to detect a cell voltage of each secondary cell 21 to 24 for control of regulating the charge current from the charger, prohibiting the discharge from the battery stack 20 upon detection of an over-discharge condition, and protecting the battery stack 20 from being over-charged, as will be discussed later.

The signal connector 40 includes, in addition to a signal ground terminal 41 connected to a circuit ground common to the detectors 50, 60, and 90, a charge control output terminal 42, a temperature output terminal 43, a discharge control output terminal 44, a trigger input terminal 45, and an ID output terminal 46. The charge control output terminal 42 is provided to output a charge control signal from the charge detector 50. The charge control signal is received at the charger 200 for regulating the charge current being supplied from the charger 200 to the battery stack 20. A temperature sensing element 13 is connected across the temperature output terminal 42 and the circuit ground to give a temperature of the battery stack 20. The discharge control output terminal 44 is provided to output a discharge stop signal from the discharge detector 60 upon detection of the over-discharging condition. The discharge stop signal is fed to the power tool 100 in order to deenergize the power tool 100, i.e., stop feeding the discharge current to the power tool 100 for protection of the secondary cells. The trigger input terminal 45 is provided to receive a trigger signal from the power tool 100 as well as from the charger 200 to start operating the discharge detector 60. An ID resistor 16 is connected across the ID output terminal 46 and the circuit ground to give a specific resistance indicative of the kind of the battery pack 10 which is taken in the power tool 100 and the charger 200 for identification of the battery pack 10. The kind of the battery pack 10 includes the number of the secondary cells and the individual capacity thereof.

The charger 200 includes a power supply 210 which converts an input AC voltage into a DC voltage for supplying the charge current to the battery stack 20, and a charge controller 220 which controls the charge current. The charge current is supplied through a charge terminal 233 and a ground terminal 232 in contact respectively with charge terminal 33 and the ground terminal 32 of the battery pack 10. The charger 200 is equipped with a signal connector 240 which is detachable to the signal connector 40 of the battery pack 10 for receiving and sending signals through terminals 241 to 246 from and to the battery pack 10.

The power tool 100 includes an electric motor 110 as a driving source of the power tool, a trigger switch 114 to be manipulated by a user, and a motor controller 120 for controlling the motor 110. The motor 110 is energized by a discharge current supplied from the battery stack 20 through a power terminal 131 and a ground terminal 132 in contact respectively with the positive output terminal 31 and the ground terminal 32 of the battery pack 10. The power tool 100 is equipped with a signal connector 140 which are detachable to the signal connector 40 of the battery pack 10 for receiving and sending signal through the terminals 141 to 146 from and to the battery pack 10.

The charge detector 50 is configured to detect the cell voltage across each one of the secondary cells 21 to 24 so as to provide a high charge-control signal when all of the cell voltages are lower than a first threshold ($V_{TH1}$), for example, 4.2V, and a low charge-control signal when any one of the cell voltages becomes higher than the first threshold ($V_{TH1}$). The charge-control signal is fed through terminals 42 and 242 to the charge controller 220 which regulates to supply a high charge current in response to the high-charge control signal, and a low charge current in response to low charge control signal. After receiving the low charge control signal, the charge controller 220 operates to reduce the charge current gradually while monitoring the overall voltage of the battery stack 20 by means of a voltage divider of resistors 251 and 252 provided in the charger 200. The charge controller 220 stops supplying the charge current when the overall voltage of the battery stack 20 becomes higher than a predetermined limit, for example, 17.5 V.

The charge detector 50 includes a first voltage monitor 52 which detects the cell voltage across each one of the secondary cells 21 to 24, compares each cell voltage with the first threshold ($V_{TH1}$), and provides a H-level output when any one of the cell voltages is higher than the first threshold, and otherwise provides a L-level output. The output from the first voltage monitor 52 is fed to a signal interface 54 which is composed of a switching transistor 56 and a zener diode 58 to give the high charge-control signal of H-level to the charge control output terminal 42 in response to the L-level output from the first detector 52, and to give the low charge-control signal of L-level in response to the H-level output from the first detector 52. The first voltage monitor 52 is constituted by an integrated circuit, and is configured to consume a less current of as less as 1 μA from the battery stack 20. While, on the other hand, the signal interface 54 is energized by a voltage Vd available only when the battery pack 10 is connected to the charger 200.

The charge controller 220 of the charger 200 is configured to start charging the battery stack 20 upon recognizing the connection of the battery pack 10 to the charger 200, and stop the charging upon detachment of the battery pack 10. For this purpose, the charger 200 is configured to generate a pull-up voltage Vp which is applied to the terminals 243 and 246 respectively through pull-up resistors 223 and 226. When the signal connector 40 of the battery pack 10 is connected or disconnected to and from the signal connector 240 of the charger 200, the voltages at terminals 243 and 246 vary due to the connection or disconnection through terminals 43 and 46 respectively to and from the temperature sensing element 13 and the ID resistor 16. Based upon the voltage variation, the charge controller 120 acknowledges the connection and disconnection of the battery pack 10 to start and stop the charging. Also, the charge controller 120 is configured to permit the charging only when the temperature detected by the temperature sensing element 13 is below a predetermined temperature, for example, 70° C. Further, the charge controller 120 is configured to select the level of the charge current and/or charging rate thereof in accordance with the kind of the battery stack 20 identified by the voltage signal from the ID resistor 146.

The discharge detector 60 incorporated in the battery pack 10 is configured to detect the cell voltage across each one of the secondary cells 21 to 24 and to provide a discharge stop signal when any one of the cell voltages becomes lower than a second threshold ($V_{TH2}$), for example, 2.0 V lower than the first threshold ($V_{TH1}$). The discharge stop signal, which is indicative of the over-discharging of the battery stack 20, is fed through terminals 44 and 144 to the motor controller 120 of the power tool 100 in order to stop driving the motor 110, i.e., stop deriving the discharge current from the battery stack 20. The discharge detector 60 includes a second voltage monitor 70 configured to detect the cell voltage across each one of the secondary cells 21 to 24 to compare each cell voltage with the second threshold ($V_{TH2}$) and to provide a L-level output when any one of the cell voltage is lower than the second threshold ($V_{TH2}$), and otherwise provide a H-level output. The output of the second voltage monitor 70 is fed through a delay circuit 65 to a signal interface 64 which is composed of a switching transistor 66 and a zener diode 68 to give the discharge stop signal of H-level to the discharge control output terminal 44 in response to the L-level output from the voltage monitor 70. The delay circuit 65 is composed of a capacitor and a resistor to delay the output from the detector 70, and therefore the output of the signal interface 64 by a predetermined time to eliminate possible noises for reliable detection of the over-discharging.

Prior to explaining the details of the discharge detector 60, it is mentioned that the power tool 100 includes a voltage divider of resistors 151 and 152 for monitoring the overall voltage being supplied from the battery stack 20. Upon closure of the trigger switch 114 with the battery pack 10 being connected to the power tool 100, the motor controller 120 provides an enable signal to the terminal 145 which is fed through trigger input terminal 45 as the trigger signal for activating the discharge detector 60. While the voltage applied to the terminal 143 indicates that the temperature of the battery stack 20 is below the predetermined limit, the motor controller 120 activates the motor 110 and keep activating it unless receiving the discharge stop signal from the discharge detector 60. The motor controller 120 is also configured to stop the motor 110 when the overall voltage of the battery stack 20 as monitored by the voltage divider on the side of the power tool 100 is lowered below a predetermined level, for example, 10 V, as a result of the over-discharging. The predetermined voltage is known from the voltage signal of the ID resistor 16 received at the terminal 146.

The discharge detector 60 further includes a power controller 80 which energizes the second voltage monitor 70 only in response to the trigger signal received at the terminal 45 from the motor controller 120. The trigger signal is fed to a driver 88 of the power controller 80 such that the power controller 80 is activated to energize the second voltage monitor 70, i.e., connect the second voltage monitor 70 to the battery stack 20. The like enable signal is also fed from the charge controller 220 when the battery pack 10 is connected to the charger 200.

Figure 3:
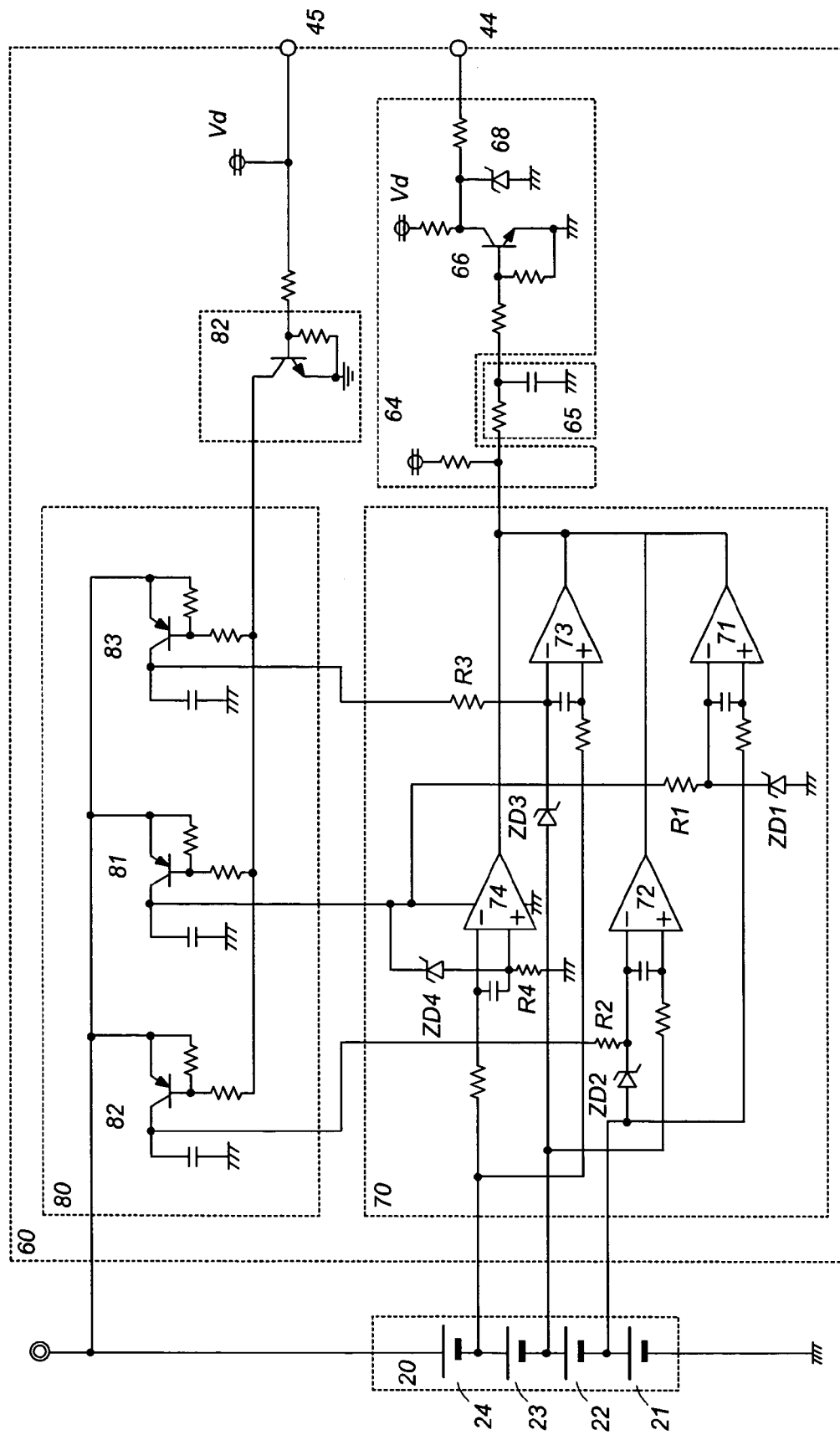
FIG. 3 is a circuit diagram of a discharge detector incorporated in the above battery pack.

As shown in FIG. 3, the second voltage monitor 70 is configured to include a plurality of comparators 71 to 74, and a plurality of zener diodes ZD1 to ZD4 each generating the second threshold ($V_{TH2}$) and connected to an input of each associated one of the comparators 71 to 74. Each of the comparators 71 to 74 are connected in circuit to compare the cell voltage of each one of the secondary cells 21 to 24 with the second threshold ($V_{TH2}$) given by each of the zener diodes ZD1 to ZD4. The power controller 80 includes a plurality of switching transistors 81 to 83 which have individual bases commonly connected to the driver 88 so as to turn on simultaneously in response to the trigger signal. The switching transistors 81 to 83 have individual collectors commonly connected to the positive end of the battery stack 20 so as to give different current supply paths, i.e., a first path extending through first transistor 81 and the zener diode ZD1 to the ground, a second path extending through the second transistor 82 and the zener diode ZD2 to a node between the secondary cells 21 and 22, a third path extending through the third transistor 83 and the zener diode ZD3 to a node between the secondary cells 22 and 23, and a fourth patch extending through the first transistor 81 and the zener diode ZD4 to the circuit ground. The first transistor 81 is. also connected to give an operating voltage to the comparators 71 to 74 integrated into a quad-comparator. Thus, the power controller 80 energizes the voltage monitor 70, i.e., supplies the current from the battery stack 20 only in response to the trigger signal, thereby generating the second threshold ($V_{TH2}$) across each of the zener diodes ZD1 to ZD4. This means that the voltage monitor 70 does not consume the current when the battery pack 10 is left detached from the power tool 100 or the charger 200. It is noted in this connection that because the voltage monitor 70 of the discharge detector 60 consumes about 1.0 mA due to the circuit design of using the quad-comparator and the individual zener diodes, which is quite higher than the current that is normally consumed at the first voltage monitor 52 of the charge detector 50, the power controller 80 is required to reduce the amount of idle currents when the battery pack 10 is left disconnected from the power tool or the charger. However, a like power controller 80 may be incorporated also in the charge detector 50 to minimize the idle current.

The first comparator 71 has its non-inverting input connected to the node between the secondary cells 21 and 22, and has its inverting input connected to the zener diode ZD1 so as to provide a L-level output when the cell voltage of the secondary cell 21 is lower than the second threshold ($V_{TH2}$) given by the zener diode ZD1. The second comparator 72 has its non-inverting input connected to the node between the secondary cells 22 and 23, and has its inverting input connected to the node between the secondary cells 21 and 22 through the zener diode ZD2 so as to provide a L-level output when the cell voltage of the secondary cell 22 is lower than the second threshold ($V_{TH2}$). Likewise, the third comparator 73 has its non-inverting input connected to the node between the secondary cells 23 and 24, and has its inverting input connected to the node between the secondary cells 22 and 23 through the zener diode ZD3 so as to provide a L-level output when the cell voltage of the secondary cell 23 is lower than the second threshold ($V_{TH2}$). The fourth comparator 74 has its non-inverting input connected to the positive pole of the battery stack 20 through the zener diode ZD4 and its inverting input connected to the node between the secondary cells 23 and 24 so as to provide a L-level output when the cell voltage of the secondary cell 24 is lower than the second threshold ($V_{TH2}$) given by the zener diode ZD4. These comparators 71 to 74 are connected in parallel with each other so that the signal interface 64 receives the L-level output and provides the H-level discharge stop signal when any one of the comparator provides the L-level output. Otherwise, the signal interface 64 receives the H-level output and in turn provides the L-level output, enabling to discharge the battery stack 20 for continued operation of the power tool 100.

Figure 4:
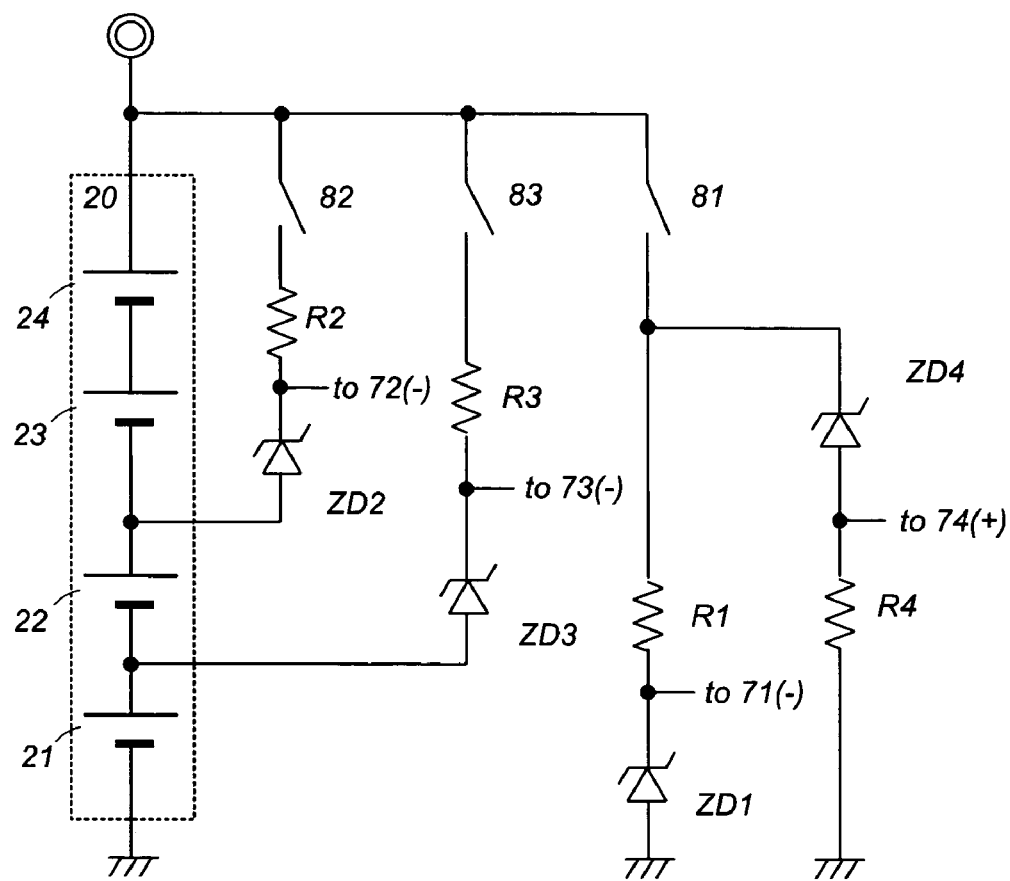
FIG. 4 is a schematic diagram illustrating different current flow paths in the above discharge detector.

As schematically shown in FIG. 4, because the switching transistors 81 to 83 give the different current paths extending from the positive terminal of the battery stack 20 respectively to the ground, the different nodes or potentials between the different adjacent pairs of the secondary cells, and also since the zener diodes are inserted respectively in the different current paths to give the second threshold ($V_{TH2}$) to the associated comparators, no leak current flows across each of the secondary cells 21 to 24 to thereby avoid unnecessary discharging the battery stack 20. Further, each of the zener diodes ZD1 to ZD4 is supplied with the combined voltage of at least two of the secondary cells 21 to 24, it is possible to apply a sufficient voltage across each zener diode even when the cell voltage of any one of the secondary cells is lowered, thereby assuring reliable detection of each cell voltage. In this regard, resistors R1 to R4, which are connected in series respectively with zener diodes ZD1 to ZD4 in the individual current flow paths, are so adjusted to flow a constant current to zener diodes ZD1 to ZD4 for consistent and reliable detection of the cell voltage of each secondary cells 21 to 24.

When the battery pack 10 is connected to the charger 200, the charge controller 220 generates and feeds the trigger signal to the driver 88 of the power controller 80 to energize the second voltage monitor 70. When the discharge stop signal is acknowledged through the terminals 44 and 144 even under a condition that the overall voltage of the battery stack 20 becomes higher than a predetermined level as indicative of that the battery stack 20 is charged sufficiently, the charge controller 220 stops the charging and issues an alert signal indicative of the occurrence of abnormal discharging during the charging. The alert signal is processed to notify the event by means of suitable display or sound. When the charging is completed or stopped, the charge controller 220 provides no trigger signal, thereby deactivating the first voltage monitor 70 through the power controller 80 for minimizing the current consumption on the side of the battery pack 10.

Turning back to FIG. 1, the battery pack 10 further includes an over-charge detector 90 which is configured to stop the inflow of the charge current when the cell voltage of any one of the secondary cells 21 to 24 becomes higher than a third threshold ($V_{TH3}$), for example, 4.5 V higher than the first threshold ($V_{TH1}$) for protection of the battery stack 20 in an event that the charge controller 220 should fail to stop supplying the charge current. The over-charge detector 90 includes a third voltage monitor 92 which is constantly energized by the battery stack 20 to compare the cell voltage of each one of the secondary cells 21 to 24 with the third threshold ($V_{TH3}$) and provides a H-level output when the cell voltage of any one of the secondary cells 21 to 24 becomes higher than the third threshold ($V_{TH3}$), thereby activating an interrupter 93 by means of a driver 98 so as to open a charge current path from the charger 200 to the battery stack 20. The interrupter 93 includes a non-resettable element 95 in the form of a fusing resistor and a heater 97 which is activated by the driver 88 to melt the element 95 to open the charge current path in an event that any one of the cells is over-charged beyond the third threshold ($V_{TH3}$). Because the interrupter 93 is inserted in the charge current path between the charge terminal 33 and the positive pole of the battery stack 20 as being separated from the discharge current path which is formed between the positive pole of the battery stack 20 and the power terminal 31 to flow the discharge current higher than the charge current, the interrupter 93 is only required to flow the relatively small charge current and can be therefore made compact and less-costly for realizing cost-effective and compact design given to the battery pack 10. The third voltage monitor 92 is designed to consume a current as less as 1 μA.

The ground terminal 32 of the battery pack 10 is separated from the circuit ground, i.e., signal ground terminal 41 of the signal connector 40 such that the discharge current or charge current is prevented from flowing in the charge detector 50, the discharge detector 60, and the over-charge detector 90, if the ground terminal 32 should fail to establish the electrical connection to the ground terminal 132 of the power tool 100, or the ground terminal 232 of the charger 200.

The above embodiment discloses the secondary cells of lithium-ion type as a most preferred application of the present invention in which the second threshold ($V_{TH2}$) is selected to be 2.0 V in consideration of that the lithium-ion cell will deteriorate when the voltage lowers below Fe precipitation voltage (1.0V) or Cu precipitation voltage (0.5V). However, the present invention is not limited to the particular type of the secondary cells and can be equally utilized for other types of the secondary cell. In this regard, the first, second and third thresholds can be suitable selected depending upon the type of the secondary cell.

The invention claimed is:

1. A rechargeable battery pack for a power tool, said battery pack comprising:
   a battery stack composed of a plurality of series connected secondary cells;
   a pair of power output terminals connected across said battery stack to supply a current from said battery stack for operating said power tool;
   a signal connector configured to include a charge control terminal, a discharge control terminal, and a signal ground terminal connected to a circuit ground,
   a charge detector configured to monitor a cell voltage appearing across each of said secondary cells and to provide a high charge-control signal when all of the cell voltages are lower than a first threshold ($V_{TH1}$) and a low charge-control signal when any one of the cell voltages becomes higher than said first threshold ($V_{TH1}$), said high charge-control signal and said low charge-control signal being fed through said charge control terminal to a charger for regulating a charge current of charging said secondary cells;
   a discharge detector configured to monitor said cell voltage across each of said secondary cells and to provide a discharge stop signal when any one of said cell voltages becomes lower than a second threshold ($V_{TH2}$) which is lower than said first threshold ($V_{TH1}$), said discharge stop signal being fed through said discharge control terminal to said power tool for deenergizing said power tool;

a charge terminal configured to be separated from one of said power output terminals and connected to said battery stack for flowing said charge current from said charger to said secondary cells not through said one of said power output terminals;

an interrupter inserted in a charge current path between said charge terminal and said battery stack; and an over-charge detector configured to monitor said cell voltage across each of said secondary cells and to actuate said interrupter to open said charge current path when any one of said cell voltages becomes higher than a third threshold ($V_{TH3}$) which is higher than said first threshold ($V_{TH1}$), wherein said interrupter is a non-resettable element, and wherein said discharge detector comprises a voltage monitor and a power controller, said voltage monitor comprising a plurality of comparators and a plurality of constant voltage elements each providing a constant voltage which defines said second threshold ($V_{TH2}$), each of said comparators being configured to compare each of said cell voltages with each of said second threshold to give a comparison result such that said discharge detector provides the discharge stop signal to the discharge control terminal based upon the comparison results, said power controller being configured to connect said battery stack to said voltage monitor when said battery pack is connected to said power tool, and said power controller having a plurality of switches, respectively, for closing a plurality of current supply paths, each providing the current from said battery stack to each one of said constant voltage elements in response to a detection signal issued when said battery pack is connected to said power tool.

2. The rechargeable battery pack as set forth in claim 1, wherein
said discharge detector includes a delay circuit which delays the discharge stop signal by a predetermined time from the detection that anyone of said cell voltages becomes lower than said second threshold.

3. The rechargeable battery pack as set forth in claim 1, wherein
said power output terminals are composed of a positive output terminal and a ground terminal, said ground terminal being electrically isolated from said signal ground terminal.

4. The rechargeable battery pack as set forth in claim 1, wherein
said signal connector includes a temperature output terminal and an ID output terminal,
said battery pack further including a temperature sensing element and an ID resistor having a resistance indicative of a kind of the battery stack,
said temperature sensing element being connected across said temperature output terminal and said signal ground terminal to provide a temperature signal indicative of a temperature of said battery stack to said temperature output terminal, and said ID resistor being connected across said ID output terminal and said signal ground terminal to provide said resistance to said ID output terminal.

5. A rechargeable battery pack, for a power tool, said battery pack comprising:
a battery stack composed of a plurality of series connected secondary cells;
a pair of power output terminals connected across said battery stack to supply a current from said battery stack for operating said power tool;
a signal connector configured to include a charge control terminal, a discharge control terminal, and a signal ground terminal connected to a circuit ground,
a charge detector configured to monitor a cell voltage appearing across each of said secondary cells and to provide a high charge-control signal when all of the cell voltages are lower than a first threshold ($V_{TH1}$) and a low charge-control signal when any one of the cell voltages becomes higher than said first threshold ($V_{TH1}$), said high charge-control signal and said low charge-control signal being fed through said charge control terminal to a charger for regulating a charge current of charging said secondary cells;
a discharge detector configured to monitor said cell voltage across each of said secondary cells and to provide a discharge stop signal when any one of said cell voltages becomes lower than a second threshold ($V_{TH2}$) which is lower than said first threshold ($V_{TH1}$), said discharge stop signal being fed through said discharge control terminal to said power tool for deenergizing said power tool;
a charge terminal configured to be separated from one of said power output terminals and connected to said battery stack for flowing said charge current from said charger to said secondary cells not through said one of said power output terminals;
an interrupter inserted in a charge current path between said charge terminal and said battery stack; and
an over-charge detector configured to monitor said cell voltage across each of said secondary cells and to actuate said interrupter to open said charge current path when any one of said cell voltages becomes higher than a third threshold ($V_{TH3}$) which is higher than said first threshold ($V_{TH1}$), wherein
said discharge detector comprises a voltage monitor and a power controller,
said voltage monitor comprising a plurality of comparators and a plurality of constant voltage elements each providing a constant voltage which defines said second threshold ($V_{TH2}$), each of said comparators being configured to compare each of said cell voltages with each of said second threshold to give a comparison result such that said discharge detector provides the discharge stop signal to the discharge control terminal based upon the comparison results,
said power controller being configured to connect said battery stack to said voltage monitor when said battery pack is connected to said power tool;
said power controller having a plurality of different current supply paths which supplies a current from a common potential of said battery stack respectively to different potentials of said battery stack through each one of said constant voltage sources of said voltage monitor,
said power controller having a plurality of switches each of which is inserted in each one of said current supply paths and is configured to close in response to a detection signal issued when said battery pack is connected to said power tool.

* * * * *